(12) United States Patent
Tamamura et al.

(10) Patent No.: US 7,537,856 B2
(45) Date of Patent: May 26, 2009

(54) FUEL CELL, FUEL SUPPLY APPARATUS THEREFOR, AND FUEL SUPPLY SYSTEM THEREFOR

(75) Inventors: Hideo Tamamura, Kanagawa-ken (JP); Masaru Yanagisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 10/664,873

(22) Filed: Sep. 22, 2003

(65) Prior Publication Data
US 2004/0058204 A1    Mar. 25, 2004

(30) Foreign Application Priority Data
Sep. 24, 2002    (JP) .................... 2002-276683

(51) Int. Cl.
H01M 2/00    (2006.01)
(52) U.S. Cl. .......................... 429/38; 429/34
(58) Field of Classification Search .......... 429/12, 429/13, 17
See application file for complete search history.

(56) References Cited

U.S. PATENT DOCUMENTS

| | | | |
|---|---|---|---|
| 6,057,051 A | 5/2000 | Uchida et al. ............. 429/19 |
| 6,447,941 B1 | 9/2002 | Tomimatsu et al. ........ 429/26 |
| 6,713,201 B2 * | 3/2004 | Bullock et al. ............ 429/12 |
| 2002/0055029 A1 | 5/2002 | Hayashi et al. ............ 429/34 |
| 2003/0096144 A1 * | 5/2003 | Dunstan ................... 429/17 |
| 2004/0131903 A1 * | 7/2004 | Shioya .................... 429/22 |

FOREIGN PATENT DOCUMENTS

| | | |
|---|---|---|
| JP | 9-213359 | 8/1997 |
| JP | 2000-106201 | 4/2000 |
| JP | 2002-49440 | 2/2002 |
| JP | 2002-56857 | 2/2002 |

* cited by examiner

*Primary Examiner*—Dah Wei Yuan
*Assistant Examiner*—Robert Hodge
(74) *Attorney, Agent, or Firm*—Fitzpatrick, Cella, Harper & Scinto

(57) ABSTRACT

A fuel supply apparatus for supplying fuel to a fuel cell has a fuel supply unit and a water suction unit. When the fuel cell is mounted onto the fuel supply apparatus, the apparatus supplies fuel to the fuel cell and removes the water inside the fuel cell by suction.

1 Claim, 4 Drawing Sheets

FUEL CELL, FUEL SUPPLY APPARATUS THEREFOR, AND FUEL SUPPLY SYSTEM THEREFOR

BACKGROUND OF THE INVENTION

1. Field of the Invention

The present invention relates to a fuel cell, a fuel supply apparatus therefor, and a fuel supply system therefor.

2. Description of the Related Art

Recently, various portable devices use fuel cells as the power source. Among many proposals for fuel cells, direct methanol fuel cells (DMFCs), in which an organic fuel, such as methanol, is directly supplied to the anode to generate power, are primary candidates for the power sources of portable devices. This is due to the fact that DMFCs do not require a reformer for reforming the organic fuel, such as methanol, to a hydrogen-rich reformed gas, and thus have a simple structure. Several proposals have been made as to the details of DMFCs (e.g., Japanese Patent Laid-Open No. 2002-056857). The operation of DMFCs can be briefly described as follows. In a typical operation, air is supplied to the cathode while supplying the organic fuel to the anode, during which the reaction described below occurs:

$$CH_3OH + H_2O \rightarrow CO_2 + 6H^+ + 6e^+ \quad (1)$$

Protons ($H^+$) generated at the anode travel to the cathode via a solid polymer membrane, i.e., an electrolyte, to react with oxygen in air as below:

$$O_2 + 4H^+ + 4e^+ \rightarrow 2H_2O \quad (2)$$

Water and carbon dioxide are generated as a result of power generation.

Other than DMFCs, fuel cells that generate power by directly supplying hydrogen stored in a hydrogen-absorbing alloy or a carbon nanotube have been proposed.

Fuel cells can generate power by simply supplying a fuel and an oxidant and can continuously generate power by replacing the fuel. Whereas secondary batteries require several hours of recharging, fuel cells can be restored instantly. Thus, the system employed in fuel cells is particularly advantageous for application to portable devices having low energy consumption.

An example that uses a fuel cell unit as the power source of a portable computer is disclosed in Japanese Patent Laid-Open No. 9-213359. In the disclosure, a system in which generated water is stored and vaporized is described in addition to basic structures such as air inlet and outlet, a fuel bottle, terminals, power generation section, and the like.

Moreover, use of fuel cells as the power source of portable computers is also known. For example, Japanese Patent Laid-Open No. 2002-49440 teaches fuel cells, whose fuel is supplied in the form of a cartridge.

However, the above-described conventional examples have the following problems. Since fuel cells inevitably produce water, the water must be discharged, removed by vaporization, or the like. Water may reach the inside of the portable device, such as a portable camera, and may thereby damage the device.

The invention set forth in Japanese Patent Laid-Open No. 9-213359 described above prevents water from affecting the portable computer. According to the disclosed structure, an internal water-retaining unit is installed inside the fuel cell unit. A water-retaining tank is also provided in case the water-retaining unit is not large enough. The water-retaining tank is detachable and the water-retaining unit is replaceable. However, according to this structure, when the fuel is replaced with new fuel, the fuel cell must be disassembled, the water-retaining tank must be separated to discharge water, and water in the water-retaining unit must be removed by drying before reassembling the fuel cell. This process is cumbersome and complicates the system. Moreover, leakage of water may result from neglect to discharge water, misassembly, or the like.

The invention set forth in Japanese Patent Laid-Open No. 2002-49440 above provides a method for discharging the produced water from a personal computer equipped with fuel cells without damaging the personal computer. However, the method uses an exhaust hose and thus cannot be applied to cameras, cellular phones, etc.

SUMMARY OF THE INVENTION

It is an object of the present invention to overcome problems of the related art by providing a fuel supplying apparatus for fuel cells that can supply fuel to the fuel cell and remove water in the fuel cell by suction. Another object of the invention is to provide a fuel cell that can be used with the above fuel supplying apparatus. Yet another object of the invention is to provide a fuel supply system that integrates the fuel cell and the fuel supplying apparatus. According to the system, fuel can be supplied to and water can be removed from the fuel cell.

A first aspect of the present invention provides a fuel supply apparatus for use with a fuel cell, the apparatus including a mounting unit for mounting the fuel cell; a fuel supplying unit for supplying fuel to the mounted fuel cell; and a water-suctioning unit for suctioning water produced inside the fuel cell.

Preferably, the fuel of the fuel supply unit is contained in a replaceable cartridge. Preferably, the water-suctioning unit has a structure that can vaporize the suctioned water. More preferably, the apparatus further includes a detecting unit for detecting that the fuel cell is mounted on the mounting unit so as to perform fuel supplying and water sucking according to the detection results. Yet more preferably, the fuel cell is used in a portable device.

A second aspect of the present invention provides a fuel cell that generates power using fuel and oxygen and discharges water produced as a result of power generation, the fuel cell including a fuel supply unit into which fuel is supplied; and a water discharging unit for discharging water. The access to the fuel supply unit and the water-discharging unit is provided at the same face of the fuel cell. Preferably, the fuel cell is used in a portable device.

A third aspect of the present invention provides a fuel supply system for fuel cells, the system including a fuel cell that generates power using fuel and oxygen and discharges water produced as a result of power generation; and a fuel supply apparatus for supplying fuel to the fuel cell. The fuel cell includes a fuel supply unit into which fuel is supplied and a water discharging unit for discharging water, wherein the access to the fuel supply unit and the water-discharging unit is provided at the same face of the fuel cell. The fuel supply apparatus includes a mounting unit for mounting the fuel cell; a fuel supply unit for supplying fuel to the mounted fuel cell; and a water-suctioning unit for suctioning water produced inside the fuel cell.

According to the fuel supply apparatus of the present invention, supplying of fuel to the fuel cell and removing water from the fuel cell by suction can be performed by simply mounting the fuel cell onto the fuel supply apparatus. A user can quickly and conveniently use the fuel cell. The present invention also provides the fuel cell in which fuel supply and water removal can be easily performed. The present invention also provides a fuel supply system that combines the fuel cell and the fuel supply apparatus. According to this system, supplying of fuel to the fuel cell and removing water from the fuel cell by suction can be performed easily and even simultaneously.

Further objects, features and advantages of the present invention will become apparent from the following description of the preferred embodiments with reference to the attached drawings.

DESCRIPTION OF THE PREFERRED EMBODIMENTS

A fuel supply apparatus for use with a fuel cell includes a mounting unit for mounting the fuel cell; a fuel-supplying unit for supplying fuel to the mounted fuel cell; and a water-suctioning unit for suctioning water produced inside the fuel cell.

The fuel supply apparatus can supply fuel to and discharge water from the fuel cell without disassembling the fuel cell unit. In operation, the fuel cell is placed on the fuel supply apparatus so that a fuel supply pin of the fuel supply apparatus is inserted into the fuel supply unit of the fuel cell and that a water suction pin is inserted into the water-discharging unit of the fuel cell. In this manner, the fuel is fed to the fuel tank of the fuel cell from the fuel supply apparatus, and water inside the fuel cell can be discharged by suction via the water suction pin. The structure of the portion of the fuel cell into which the pins of the fuel supply apparatus are inserted is the same as that of a gas lighter or portable gas container. The portion is completely sealed when no pins are inserted.

The fuel of the fuel supply apparatus is contained in a replaceable cartridge to facilitate fuel replacement. The fuel supply apparatus of the present invention is arranged such that the water recovered to the fuel supply apparatus is automatically vaporized. This structure can prevent overflow of water inside the fuel supply apparatus.

The fuel supply apparatus further includes a detecting switch for detecting the mounting of the fuel cell to prevent undesired ejection of fuel from the fuel supply pin. Use of this switch allows automatic fuel supplying and water discharging since the switch is constructed to detect the mounting of the fuel cell onto the fuel supply apparatus.

The access to the fuel supply unit and the water-discharging unit of the fuel cell is provided on the same face of the fuel cell. According to this structure, the fuel supply pin and the water suction pin can be simultaneously inserted into the fuel cell.

The invention also provides a fuel supply system for fuel cells that combines the fuel cell and the fuel supply apparatus described above. Fuel can be supplied to the fuel cell and the water inside the fuel cell can be discharged by simply mounting the fuel cell onto the fuel supply apparatus.

It should be noted that the term "fuel supply system" refers to a combination of the fuel cell and the fuel supply apparatus or to a combination of fuel supply unit of the fuel supply apparatus and a fuel supply unit of the fuel cell into which the fuel is supplied.

The present invention will now be described by embodiments. FIGS. 1 to 4 show preferred embodiments of the present invention. Each of the elements shown in block outline in the figures is well known per se, and a specific type of construction is not critical to carrying out the invention or to a disclosure of the best mode for carrying out the invention.

Figure 1:
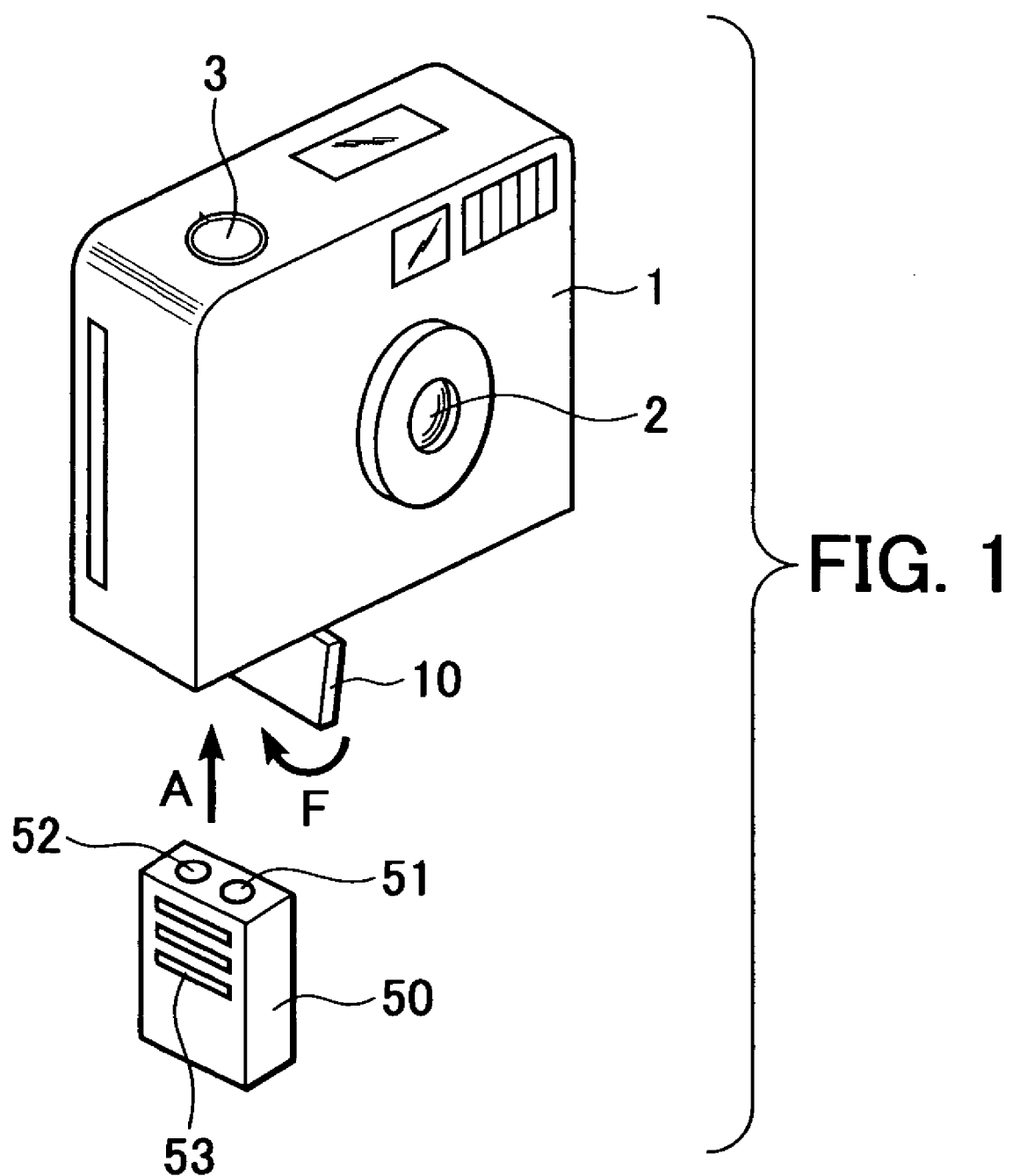
FIG. 1 is a perspective view of a portable device, i.e., camera, and a fuel cell of the present invention.

FIG. 1 is a perspective view of a camera, i.e., a portable device, loaded with a fuel cell according to a first embodiment of the present invention. The camera has a camera main body 1, a lens 2, a release button 3, and a battery cover 10. The battery cover 10 is shut in the direction of the arrow F. A fuel cell (unit) 50 has power terminals 51 and 52 and an intake 53 for introducing air into the fuel cell 50.

The fuel cell 50 uses methanol or the like as the fuel to achieve the size reduction required for use in portable devices. The working inner structure of the fuel cell is, for example, the same as that described in Japanese Patent Laid-Open No. 2000-106201, Japanese Patent Laid-Open No. 2002-56857, or literature regarding fuel cells for use in portable devices. The fuel cell 50 is inserted into the camera in the direction of arrow A.

Figure 2:
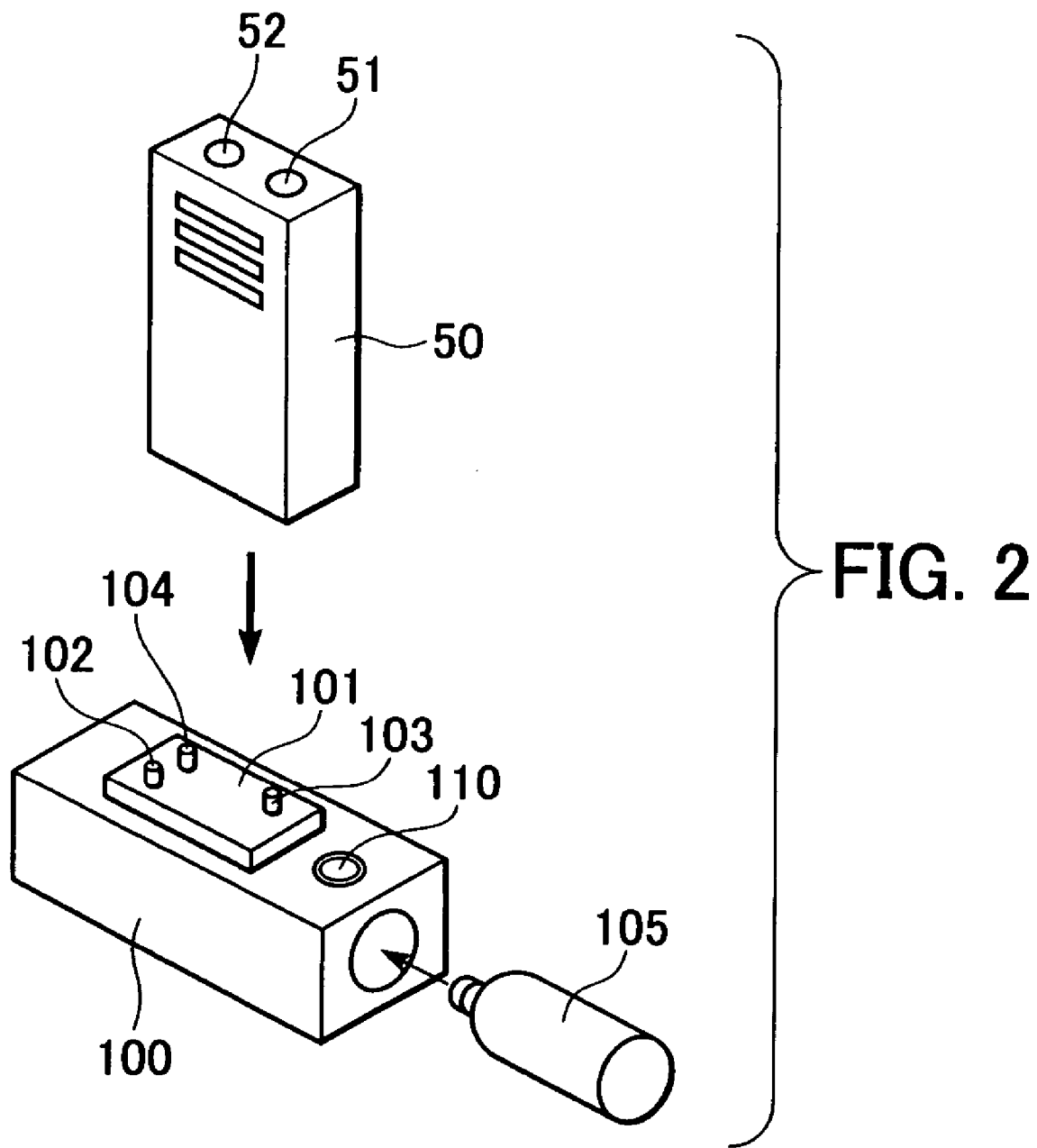
FIG. 2 is a perspective view of a fuel supplying apparatus of the present invention.

FIG. 2 is a perspective view of a fuel supply apparatus according to one embodiment of the present invention. The fuel cell 50 is mounted onto a mounting face 101 of a fuel supply apparatus 100. The fuel supply apparatus 100 has a detector 102 for detecting the mounting of the fuel cell. The fuel supply apparatus 100 detects that the fuel cell is mounted when the mounted fuel cell pushes the detector 102. The fuel supply apparatus 100 also has a fuel supply pin 103 and a water suction pin 104. The fuel supply pin 103 and the water suction pin 104 have different sizes to prevent misplacement of the fuel cell. The fuel of the fuel supply apparatus 100 is provided in the form of a cartridge, i.e., by a fuel cartridge 105, to facilitate the replacement.

Figure 3:
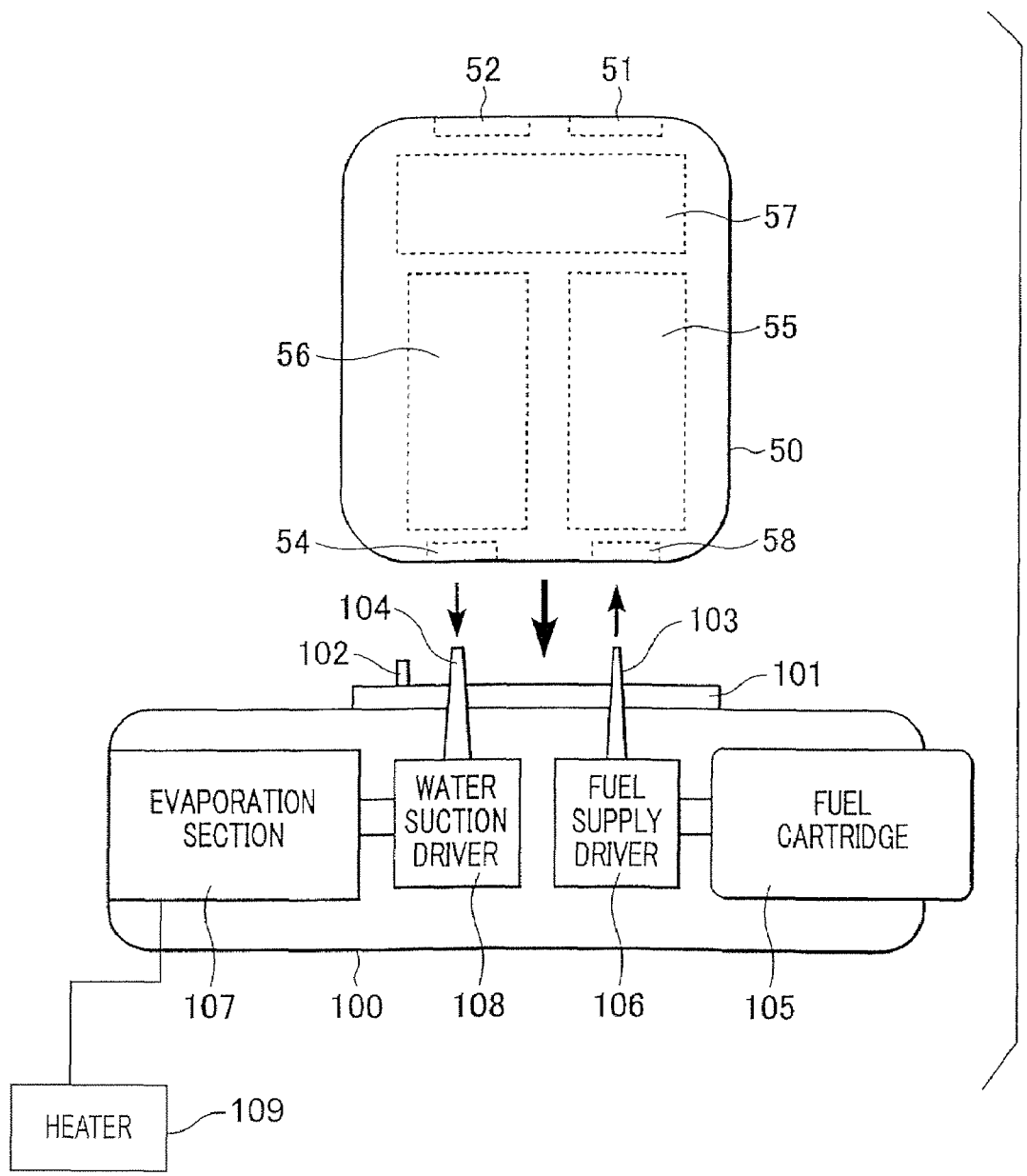
FIG. 3 is a perspective schematic diagram of the fuel supplying apparatus and the fuel cell.

FIG. 3 is a perspective schematic view for explaining the operation of the fuel supply apparatus 100 and the fuel cell 50. The fuel cell 50 has the power terminals 51 and 52, a fuel supply section 58, a water drainage section 54, a fuel tank section 55, a water tank 56, and a power generating section 57.

The fuel supply apparatus 100 has a mounting unit 101 onto which the fuel cell 50 is mounted; a fuel supply driver 106 (corresponds to 154 in FIG. 4) for pressurizing the fuel inside the fuel cartridge 105 to supply the fuel to the fuel cell; a water suction driver 108 (corresponds to 153 in FIG. 4) for suctioning water inside the water tank 56 of the fuel cell 50 via the water suction pin 104; and an evaporation section 107 for storing and vaporizing the retrieved water.

Figure 4:
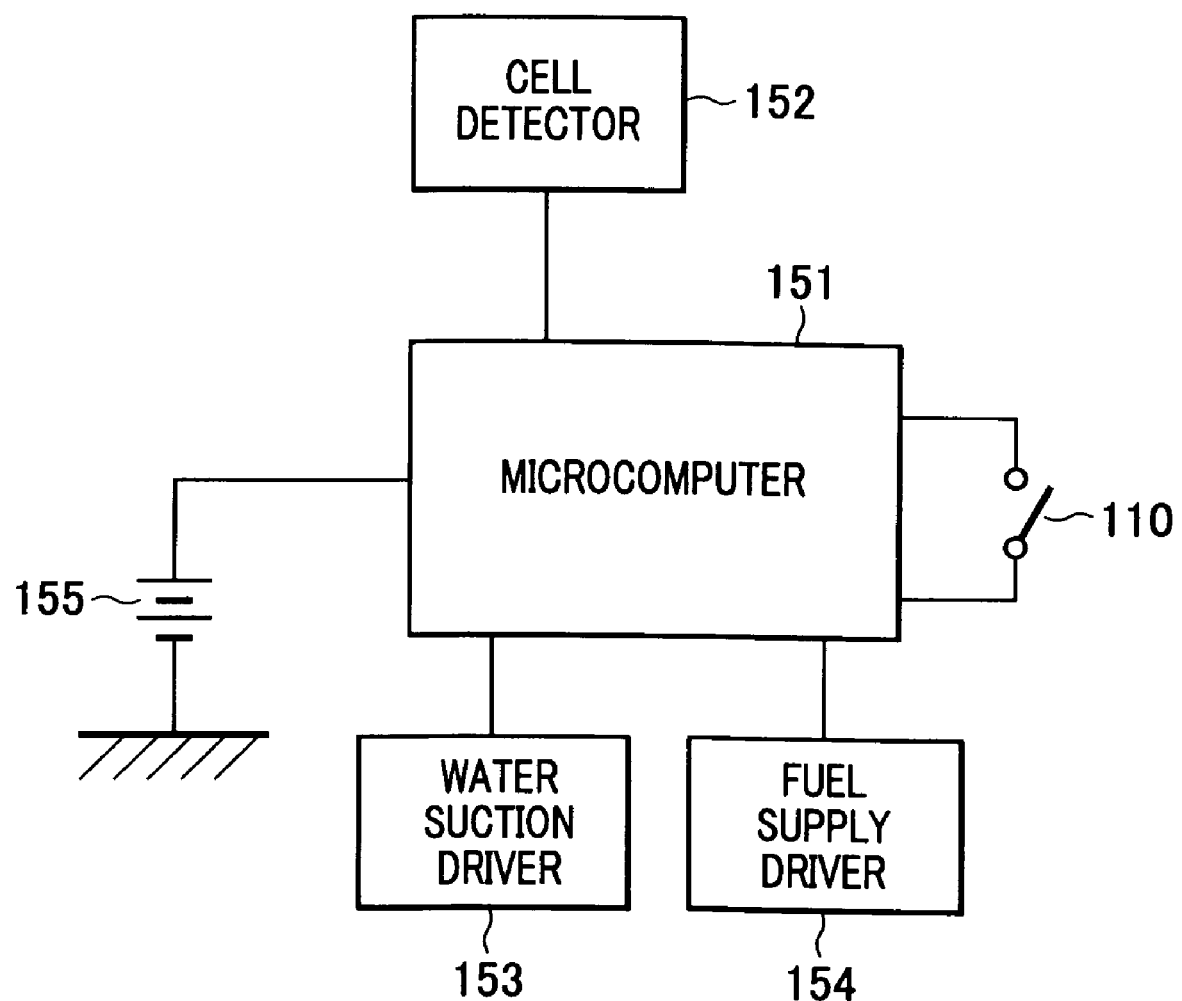
FIG. 4 is a diagram of a circuit for driving the fuel supplying apparatus of the present invention.

The fuel supply driver 106 includes a driving element (not shown) and supplies the fuel to the fuel tank section 55 of the fuel cell 50 via the fuel supply pin 103. The water suction driver 108 includes a driving element (not shown) that sucks water inside the water tank 56 of the fuel cell 50 and transfers the water to the evaporation section 107. The supplying of fuel into the fuel cell and discharge of water are initiated by operating a switch 110 (FIG. 4). As the fuel tank section 55 becomes full, the fuel supply pressure increases and the fuel supply stops automatically. The suction of water is stopped when a detector (not shown) detects that the water suction pin 104 is no longer sucking water.

FIG. 4 is a diagram showing a circuit for driving the fuel supply apparatus 100. The circuit includes a microcomputer 151, a cell detector 152 (corresponds to the detector 102 in FIG. 3), a water suction driver 153, a fuel supply driver 154, a power source 155, and a switch 110.

When the fuel cell 50 is mounted onto the fuel supply apparatus 100, the cell detector 152 detects the mounting and puts the fuel supply apparatus 100 in a stand-by mode. By operating the switch 110, the fuel supply driver 154 starts operating and the driving element thereof (not shown) supplies the fuel from the fuel cartridge 105 into the fuel tank section 55 of the fuel cell 50. Simultaneously, the water suction driver 153 starts operating and the driving element thereof (not shown) sucks the water stored in the water tank 56 of the fuel cell 50. The retrieved water is transferred to the evaporation section 107. In the evaporation section 107, evaporation of the transferred water is accelerated by heating the container with a heater 109. The microcomputer 151 detects that the fuel tank section 55 of the fuel cell 50 is full by a change in pressure in the fuel supply driver 154. The microcomputer 151 transmits a stop signal to stop the operation of the driver. The water suction driver 153 stops operating when it detects that there is no more water to suck.

The fuel supply apparatus of this embodiment can be used with fuel cells for cameras, personal computers, portable devices, toys, video camcorders, and the like. The fuel cells of the present invention are particularly suitable for use in portable devices, such as digital cameras.

The fuel supply apparatus of this embodiment can serve commercial and corporate needs as well as personal needs. For example, the fuel supply apparatus may be used as a "fuel supply station", which is becoming increasingly popular in convenience stores. A company may use the fuel supply apparatus to recharge recovered fuel cells.

According to the present invention, supplying fuel to the fuel cell is simplified since is can be done by replacing fuel cartridges. Moreover, when the fuel cartridge is made using a transparent material, the amount of the fuel remaining in the cartridge can be determined instantly.

According to the fuel supply apparatus of the present invention, there is no need to manually discard water from the apparatus since the apparatus automatically vaporizes the water retrieved from the fuel cell. Moreover, since the mounting of the fuel cell is detected, fuel can be supplied from the apparatus without failure. Furthermore, since the fuel supply unit and the water discharging unit of the fuel cell are provided on the same face of the fuel cell, the fuel supply pin and the water suction pin of the fuel supply apparatus can be arranged on the same face of the fuel supply apparatus. As a result, the structure of the fuel supply apparatus can be simplified.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

Note that the present invention can be applied to fuel cells that operate by supplying gaseous fuel, such as hydrogen, to a fuel electrode and to fuel supply apparatuses for use with such fuel cells as well as fuel cells that operate by supplying liquid fuel, such as methanol, to a fuel electrode and to fuel supply apparatuses for use with such fuel cells. In such a case, the fuel stored in the fuel supply apparatus is supplied to the fuel cell in the form of liquid or gas.

What is claimed is:

1. A fuel supply system for fuel cells, the system comprising:
a fuel cell that generates power using fuel and oxygen and discharges water produced as a result of power generation; and
a fuel supply apparatus for supplying the fuel to the fuel cell, wherein:
(A) the fuel cell comprises a fuel supply unit into which the fuel is supplied and a water discharging unit for discharging the water, wherein access to the fuel supply unit and the water-discharging unit is provided at a same face of the fuel cell; and
(B) the fuel supply apparatus comprises a mounting unit for mounting the fuel cell, a fuel supply unit for supplying the fuel to the mounted fuel cell, a water-suctioning unit for suctioning the water produced inside the fuel cell, a detecting switch on the mounting unit for detecting the mounting of the fuel cell, and a switch provided separately from the detecting switch for starting to supply the fuel to the fuel cell.

* * * * *